United States Patent [19]

Budnik

[11] Patent Number: 4,521,726
[45] Date of Patent: Jun. 4, 1985

[54] CONTROL CIRCUITRY FOR A PULSE-WIDTH-MODULATED SWITCHING POWER SUPPLY

[75] Inventor: Brian J. Budnik, Schaumburg, Ill.

[73] Assignee: Motorola, Inc., Schaumburg, Ill.

[21] Appl. No.: 537,555

[22] Filed: Oct. 3, 1983

Related U.S. Application Data

[63] Continuation-in-part of Ser. No. 322,140, Nov. 17, 1981, abandoned.

[51] Int. Cl.³ .............................................. G05F 1/56
[52] U.S. Cl. ................................... 323/283; 323/284
[58] Field of Search ............... 323/281, 282, 283, 284, 323/285, 288, 290, 349, 350, 351, 901, 908

[56] References Cited

U.S. PATENT DOCUMENTS

| | | | |
|---|---|---|---|
| 3,193,696 | 7/1965 | Waldron | 323/282 |
| 3,241,036 | 3/1966 | Rhyne | 323/290 |
| 3,702,434 | 11/1972 | Ryan | 323/282 |
| 3,790,878 | 2/1974 | Brokaw | 323/285 |
| 4,325,021 | 4/1982 | McMackin | 323/288 |
| 4,355,277 | 10/1982 | Davis et al. | 323/351 |
| 4,395,675 | 7/1983 | Toumani | 323/282 |

*Primary Examiner*—William H. Beha, Jr.
*Assistant Examiner*—Jeffrey Sterrett
*Attorney, Agent, or Firm*—Rolland R. Hackbart; Edward M. Roney; James W. Gillman

[57] ABSTRACT

Improved control circuitry for pulse-width-modulated power supplies is described that includes a pulse generator for generating a train of trigger pulses at a predetermined repetition frequency, a signal source for generating a reference voltage and a comparator for comparing the power supply output voltage to the reference voltage and generating a first state of a switching control signal in response to each trigger pulse from the pulse generator and a second state of the switching control signal when the magnitude of the power supply output voltage is equal to the magnitude of the reference voltage. The first state of the switching control signal enables switching transistors of the switching power supply, and the second state of the switching control signal disables the switching transistors. The comparator also includes circuitry for reducing the magnitude of the reference voltage when the switching control signal has the second state. Thus, once the switching transistors are disabled by the second state of the switching control signal, the magnitude of the reference voltage is reduced by a predetermined amount so that the switching transistors cannot be re-enabled until the next trigger pulse from the pulse generator causes the switching control signal to change states.

15 Claims, 3 Drawing Figures

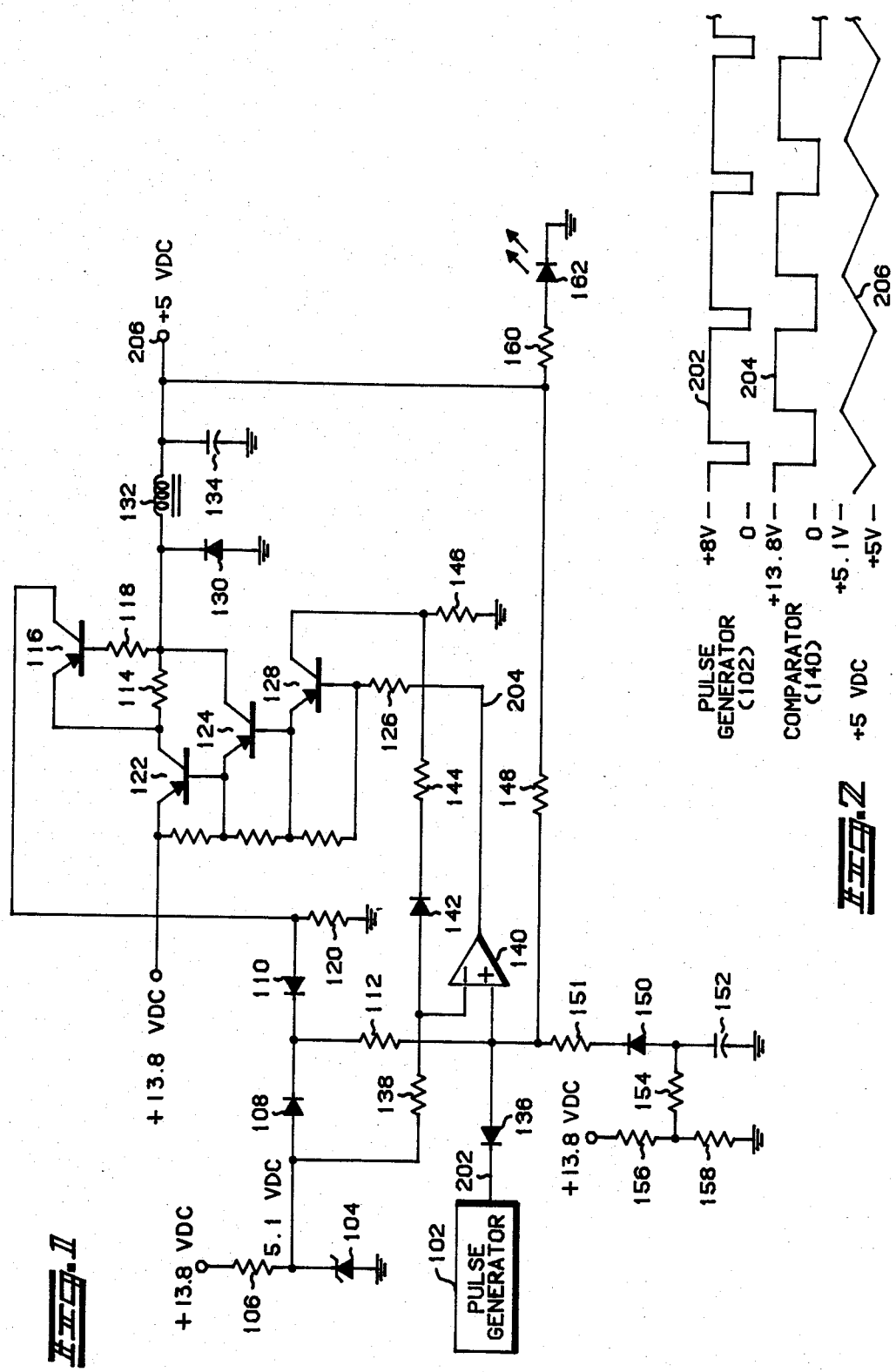

CONTROL CIRCUITRY FOR A PULSE-WIDTH-MODULATED SWITCHING POWER SUPPLY

This is a continuation-in-part of application Ser. No. 322,140, filed Nov. 17, 1981 now abandoned.

BACKGROUND OF THE INVENTION

The present invention is generally related to pulse-width-modulated (PWM) switching power supplies, and more particularly to improved control circuitry for PWM switching power supplies.

In the prior art, the three most common types of switching power supplies are the self-excited switching power supply, the frequency-modulated switching power supply and the PWM switching power supply. In the self-excited switching power supply, the frequency of operation and pulse width of the switching control signal are dependent upon the magnitude of the inductance and capacitance used in the output voltage filtering circuitry, as well as on the input voltage, output voltage, and output current. Since both the frequency of operation and pulse width of the switching control signal vary widely, the efficiency and peak current in the switching transistors of the self-excited switching power supply likewise vary widely necessitating the use of electrical circuit components that are rated to accommodate relatively high currents and high power dissipations. Furthermore, the frequency of self-excited switching power supplies may wander into the audio spectrum, thus becoming audible noise.

In frequency-modulated switching power supplies, the pulse width of the switching control signal has a predetermined length, and the number of pulses in a given time interval is varied in accordance with the output load requirements. However, the frequency of operation of frequency-modulated switching power supplies varies widely and therefore may also become audible as in the case of the self-excited switching power supply.

In PWM switching power supplies, the frequency of operation is fixed and the duty cycle of the switching control signal varies in accordance with the input voltage and the output load requirements. The frequency of operation is typically selected to be 20 kHz or higher so as to be inaudible to the human ear. For these reasons, PWM switching power supplies are generally preferrable over both the self-excited switching power supplies and frequency-modulated switching power supplies.

However, prior art PWM switching power supplies typically include an error amplifier which compares the output voltage to a reference voltage to provide an amplified error voltage for varying the duty cycle of the switching control signal. The error amplifier filters out ripple on the output voltage and also amplifies the difference between the output voltage and the reference voltage. Because of the filtering provided by the error amplifier, the response time of such PWM switching power supplies to a transient change in load current or input voltage is relatively slow compared to their frequency of operation. As the transient response is improved, the stability of such PWM switching power supplies is degraded. Also, if the frequency of operation is increased to provide faster transient response, efficiency is reduced due to increased switching losses. Thus, when using such PWM switching power supplies, tradeoffs must be made between transient response time, loop stability, switching frequency and efficiency of operation. For the foregoing reasons there is a long-felt need for an improved control circuitry for PWM switching power supplies that eliminates the need for an error amplifier and that responds rapidly to transients without degrading loop stability or efficiency.

SUMMARY OF THE INVENTION

It is an object of the present invention to provide inexpensive and improved control circuitry for PWM switching power supplies that rapidly responds to transients while also providing stable and efficient operation.

It is another object of the present invention to provide improved control circuitry for PWM switching power supplies that eliminates the need of an error amplifier as required in prior art PWM switching power supplies.

It is yet another object of the present invention to provide improved control circuitry for PWM switching power supplies that provides tight output voltage regulation, fast transient response and stable and efficient operation over the extended temperature range encountered in vehicular applications.

In an embodiment of the present invention, improved control circuitry for a PWM switching power supply includes a pulse generator for generating a train of trigger pulses at a predetermined repetition frequency, a signal source for generating a reference voltage and a comparator for comparing the power supply output voltage to a reference voltage and generating a first state of a switching control signal in response to each trigger pulse from the pulse generator and a second state of the switching control signal when the magnitude of the power supply output voltage is equal to the magnitude of the reference voltage. The first state of the switching control signal enables switching transistors of the switching power supply, and the second state of the switching control signal disables the switching transistors. The comparator also includes circuitry for reducing the magnitude of the reference voltage when the switching control signal has the second state. Thus once the switching transistors are disabled by the second state of the switching control signal, the magnitude of the reference voltage is reduced by a predetermined amount so that the switching transistors cannot be re-enabled until the next trigger pulse from the pulse generator causes the switching control signal to change state. This mode of operation not only prevents false switching but also prevents self oscillation, while at the same time it responds to changes in the input voltage or output current within a period of time that is at most the time interval between pulses.

BRIEF DESCRIPTION OF THE DRAWINGS

FIG. 1 is a detailed circuit diagram of a PWM switching power supply embodying the improved control circuitry of the present invention.

FIG. 2 illustrates waveforms of signals occurring at selected places in the circuit diagram in FIG. 1.

DETAILED DESCRIPTION OF THE PREFERRED EMBODIMENT

Figure 3:
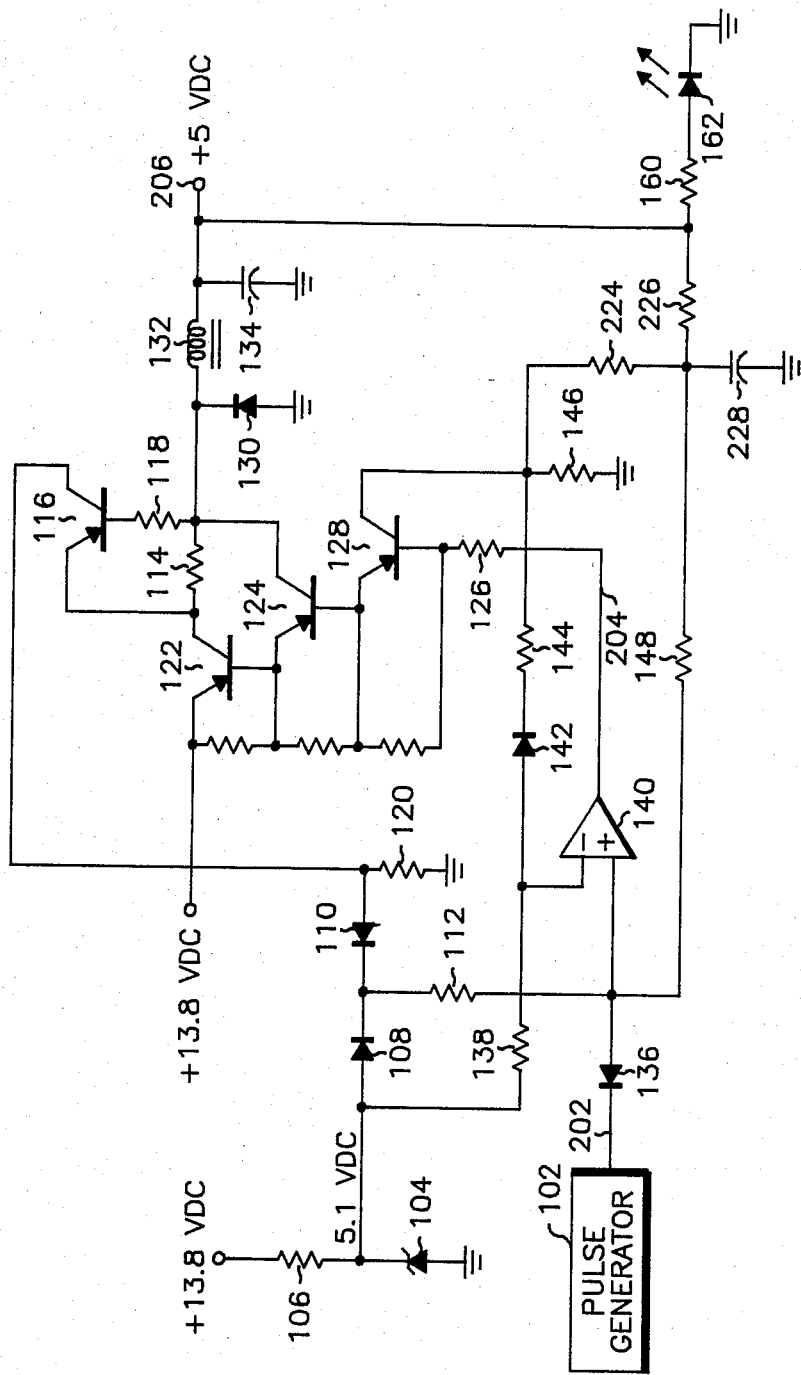
FIG. 3 is a detailed circuit diagram of another PWM switching power supply embodying the present invention.

In FIG. 1, there is illustrated a PWM switching power supply of the type commonly referred to as a switching buck regulator that includes improved control circuitry embodying the present invention. The PWM switching power supply is coupled to a DC voltage source, such as, for example, a nominal 13.8 VDC voltage source, and generates a DC output voltage, which here is 5 VDC. The output voltage provided by the PWM switching power supply in FIG. 1 can be set to any desired magnitude that is less than the input supply voltage simply by changing zener diode 104. The PWM switching power supply in FIG. 1 may be advantageously utilized in mobile and fixed station radios for generating from an input voltage ranging from 10 to 18 VDC the 5 VDC supply voltage used for powering digital integrated circuits, such as microcomputers and logic circuitry. The improved control circuitry of the present invention may also be adapted for use with various other types of conventional switching power supplies.

Referring to FIG. 1, switching transistors 122 and 124, diode 130, inductor 132, capacitor 134, resistor 126 and base drive transistor 128 are typically parts of the switching circuitry in conventional PWM switching power supplies. Switching transistors 122 and 124 are turned on by base drive transistor 128 in response to the switching control signal from comparator 140. In some applications, only a single switching transistor 122 need be utilized. When switching transistors 122 and 124 turn on, the input voltage is applied to inductor 132 and diode 130. The current set up in inductor 132 when switching transistors 122 and 124 turn on is maintained by diode 130 when switching transistors 122 and 124 turn off. The current from inductor 132 charges capacitor 134 and provides part of the current to the load coupled to the 5 VDC output voltage.

The improved control circuitry of the present invention shown in FIG. 1 includes pulse generator 102, comparator 140 and the electrical circuit components coupled thereto. Pulse generator 102 provides a train of negative going trigger pulses, as illustrated by waveform 202 in FIG. 2, which are coupled via diode 136 to the plus input of comparator 140. The pulse repetition frequency of pulse generator 102 is typically 20 kHz or greater so as to be inaudible to the human ear. For a pulse repetition of 20 kHz, each pulse may have a width of typically 1 to 2 microseconds, and the time between successive pulses is 50 microseconds. Pulse generator 102 may be any suitable conventional circuitry, such as, for example, a Motorola type MC1455 timer.

A reference voltage of 5.1 VDC is provided by resistor 106 and zener diode 104 and is coupled to the minus input of comparator 140 by way of resistor 138. Selection of the reference voltage determines the peak magnitude of the 5 VDC output voltage. Thus, the output voltage can be changed to any desired voltage by changing zener diode 104.

Comparator 140 in FIG. 1 may be a Motorola type MC3302 comparator having an open-collector output for generating the switching control signal. The output of comparator 140 has two states, a zero volt state and an open or 13.8 V state. Comparator 140 provides a zero volt output in response to each trigger pulse coupled from pulse generator 102 by diode 136 to its plus input and compares the 5.1 VDC reference voltage at its minus input to the 5 VDC output voltage coupled via resistor 148 to its plus input and provides a 13.8 V output when the 5 VDC output voltage reaches the 5.1 VDC reference voltage. If comparator 140 provides a zero volt output, base drive transistor 128 is turned on and correspondingly turns on switching transistors 122 and 124. Conversely, if comparator 140 provides a 13.8 V output, base drive transistor 128 is turned off and switching transistors 122 and 124 are likewise turned off. A typical waveform of the switching control signal provided by comparator 140 is illustrated by waveform 204 in FIG. 2.

When comparator 140 provides a 13.8 V output, transistor 128 is turned off and diode 142 is forward biased by way of resistors 144 and 146, causing the reference voltage at the minus input of comparator 140 to be reduced from 5.1 VDC to approximately 1.5 VDC due to the voltage drop in resistor 138. Thus, when the magnitude of the 5 VDC output voltage reaches 5.1 VDC, comparator 140 provides a 13.8 V output and reduces the reference voltage at its minus input. As a result, switching transistors 122 and 124 are turned off and cannot be turned on again until the next trigger pulse is provided by pulse generator 102, since the magnitude of the 5 VDC output voltage will not drop to anywhere near 1.5 VDC during the time interval between consecutive pulses from pulse generator 102.

The output from pulse generator 102 has an eight volt level between pulses and has a zero volt level during each pulse, as illustrated by waveform 202 in FIG. 2. Thus, diode 136 is reverse biased between pulses and forward biased during each pulse. Each pulse from pulse generator 102 discharges capacitor 152 by way of diode 136, resistor 151 and diode 150 and also applies a low volage level by way of diode 136 to the plus input of comparator 140, causing comparator 140 to provide a zero volt output. The zero volt output from comparator 140 turns on transistor 128 which applies approximately 11.7 V to resistors 144 and 146 for reverse biasing diode 142 and raising the reference voltage at the minus input of comparator 140 back to 5.1 VDC, assuming it had previously been reduced. Thus, each trigger pulse from pulse generator 102 causes the switching control signal from comparator 140 to have a zero volt level for enabling switching transistors 122 and 124 for at least the duration of the pulse. If the magnitude of the 5 VDC output voltage still is at or near 5.1 VDC when each trigger pulse occurs, as is the case for very light loads, the switching control signal provided by comparator 140 will change from a zero volt level to a 13.8 V level at the end of each trigger pulse from pulse generator 102.

Since the output of comparator 140 has a zero volt level for at least 1 to 2 microseconds during each pulse, a minimum current drain is provided by means of resistor 160 and light emitting diode 162 to prevent the 5 VDC output voltage, from climbing above 5.1 V when not connected to a load. If an on/off switch is included in series with the input voltage to the PWM switching power supply, light emitting diode 162 also provides a visual indication of when the power supply is on or off. Any other device, including a resistor, could be used to supply the minimum load (which in this case is 20 mA).

The foregoing unique operation of the improved control circuitry of the present invention prevents self oscillation by shutting off switching transistors 122 and 124 when the magnitude of the 5 VDC output voltage reaches the same magnitude as the 5.1 VDC reference voltage, and thereafter reduces the reference voltage to 1.5 VDC. Once turned off, switching transistors 122 and 124 cannot be cycled on and off again due to ripple on the 5 VDC output voltage. In other words, switching transistors 122 and 124 remain off until the next trigger pulse from pulse generator 102 causes the switching control signal from comparator 140 to change state from a 13.8 V level to a zero volt level. Since the pulse repetition frequency of pulse generator 102 is typically 20 kHz or greater, switching transistors 122 and 124 are re-enabled within a time interval of at most 50 microseconds for accommodating any transients in the load current or input voltage that may have occurred since switching transistors 122 and 124 had been turned off. Thus, the inventive power supply control circuitry turns on switching transistors 122 and 124 in reponse to each trigger pulse from pulse generator 102 and thereafter shuts off switching transistors 122 and 124 when the output voltage level reaches 5.1 VDC, as illustrated by waveform 206 in FIG. 2. This operation fixes the peak of the ripple on the 5 VDC output voltage at 5.1 VDC.

The PWM switching power supply in FIG. 1 also includes current limiting circuitry comprising electrical circuit components 108, 110, 112, 114, 116, 118 and 120. The current limit is set by selecting the value of resistor 114 so transistor 116 is turned on when a predetermined current is passing through resistor 114. For example, for an output current rating of 2 amps, the current limit may be set at 2.5 amps. The current limit set by resistor 114 and transistor 116 insures that switching transistors 122 and 124 will not be damaged by short circuits on the power supply output or inrush current during star-up. Furthermore, since current limit resistor 114 is connected between the collector terminals of switching transistors 122 and 124, transistor 122 can be operated closer to saturation than traditionally possible in a Darlington configuration, thus minimizing its power dissipation.

When the current limit is reached, transistor 116 is turned on by the voltage across resistor 114 and generates a voltage across resistor 120 that causes comparator 140 to turn off switching transistors 122 and 124. The base current in transistor 116 at current limit is limited by resistor 118. The voltage across resistor 120 at current limit is coupled to the plus input of comparator 140 via diode 110 and resistor 112 and causes comparator 140 to both shut off switching transistors 122 and 124 and reduce the reference voltage at its minus input so that switching transistor 122 and 124 remain off until the next pulse from pulse generator 102 re-triggers comparator 140. If the 5 VDC output voltage has a magnitude less than the magnitude of the reduced reference voltage, a condition generally occuring only during current limiting, the plus input of comparator 140 is held at approximately 4 VDC by diode 108 and resistor 112 for insuring that the output of comparator 140 does not change state and turn on switching transistors 122 and 124 immediately after turning them off due to current limiting. Conditions causing the 5 VDC output voltage to be less than the reduced reference voltage may occur at power supply turn on or when the 5 VDC output voltage is short circuited.

The PWM switching power supply in FIG. 1 also includes duty-cycle adjusting circuitry comprising electrical circuit components 150, 151, 152, 154, 156 and 158 for substantially equalizing the relative time durations of successive zero volt states of the switching control signal from comparator 140. It is desirable that the duty cycle of the switching control signal (see waveform 204 in FIG. 2) be approximately the same from period to period when the PWM switching power supply is on and operating. If the duty cycle of the switching control signal differs appreciably from period to period, a frequency component at some fraction of the pulse repetition frequency can be created (usually one-half of this frequency, or 10 kHz for a 20 kHz pulse repetition frequency), resulting in a possible audible whine. The duty cycle of the switching control signal is equalized by limiting the maximum time duration that it can have a zero volt state.

It is well known that the theoretical duty cycle, or the ratio of the on time $T_{on}$ to the period T of the switching control signal in a classical PWM switching buck regulator is approximately equal to the ratio of the magnitude of the output voltage $V_{out}$ to the magnitude of the input voltage $V_{in}$. This approximation is true when the current in inductor 132 is large enough so that it does not decrease to zero during the time when the switching transistors are turned off. This relationship can be expressed by the following equation:

DUTY CYCLE=$T_{on}/T=V_{out}/V_{in}$.

Therefore, in order to keep the duty cycle of the switching control signal substantially uniform from period to period, capacitor 152 charges to approximately 5.1 VDC in a time period that varies in proportion to the magnitude of the input voltage, which is used to set the voltage at resistor 154 by way of voltage divider resistors 156 and 158. Resistor 154 and capacitor 152 are preferably chosen so that capacitor 152 charges to 5.1 V in a time period that is slightly more than the maximum on time, $T_{on}=(T)(V_{out}/V_{in})$. For example, if the pulse repetition frequency of pulse generator 102 is 20 kHz (a period of 50 microseconds) and the input voltage is 13.8 VDC, capacitor 152 and resistor 154 may be selected so that capacitor 152 charges to a voltage level of 5.1 VDC in a time period that is slightly more than 18 microseconds.

Another method of adjusting the duty cycle of the switching control signal provided by comparator 140 in FIG. 1 is to replace electrical circuit components 150, 151, 152, 154, 156 and 158 with a single capacitor to provide a low-pass filter. The low-pass filter tends to stretch the on time of switching transistors 122 and 124 by delaying the ripple in the 5 VDC output voltage that is fed back to the plus input of comparator 140. However, the use of a low-pass filter is less desirable than the foregoing method of controlling the duty cycle of the switching control signal since short duty cylces are filtered more than long duty cycles producing a peak voltage greater than 5.1 V for high input voltages. Thus, when using a low-pass filter, the output regulation varies depending on the magnitude of the input voltage.

Referring to FIG. 3, there is illustrated another PWM switching power supply including the preferred embodiment of the improved control circuitry of the present invention. Circuit elements in FIG. 3 identical to those in FIG. 1 have been labelled with the same reference numerals. As described generally hereinabove, a low-pass filter, including resistor 226 and capacitor 228, couples the 5 VDC output voltage to the plus input of comparator 140. Feedback resistor 224 causes capacitor 228 to charge faster when the 13.8 VDC input voltage is high and the duty cycle of the switching control signal 204 is small, than when the 13.8 VDC input voltage is low and the duty cycle of the switching control signal 204 is large. In short, resistor 224 shifts the DC level of capacitor 228 to compensate for the adverse effects of low-pass filtering. Another advantage resulting from the use of feedback resistor 224 is that the duty cycle of switching control signal 204 is equalized from period to period. The only drawback to the use of resistor 224 and low-pass filter 226,228 is that the response time to transients on the 5 VDC output voltage is somewhat slower.

In summary, improved control circuitry for a PWM switching power supply has been described that is less expensive and more stable than prior art control circuitry. Furthermore, the improved control circuitry of the present invention not only provides for stable and efficient operation of a PWM switching power supply, but also provides tight output voltage regulation and fast transient response. The improved control circuitry of the present invention can be utilized in PWM switching power supplies where the output voltage rises during the time that the switching transistors are turned on (as is the case with most switching power supplies including buck regulators, forward converters, half-bridge and full-bridge circuits and traditional center-tapped primary switching circuits), but cannot be utilized in boost type PWM switching power supplies where the output voltage falls during the time that the switching transistors are turned on.

I claim:

1. Control circuitry for a pulse-width-modulated power supply including switching means responsive to a first state of a control signal for coupling an input voltage from an input voltage source to output means and to a second state of the control signal for decoupling the input voltage from the output means for generating an output voltage, said control circuitry comprising:
a pulse signal source for generating a train of pulses at a predetermined repetition frequency;
a reference signal source for generating a reference voltage;
means, having a first input coupled by input resistor means to the reference voltage and a second input coupled by the output means to the output voltage, for comparing the output voltage to the reference voltage and generating at its output the first state of the control signal in response to each pulse from the pulse signal source and the second state of the control signal when the magnitude of the output voltage is substantially equal to the reference voltage; and
means coupled to the first input of the comparing means for reducing the magnitude of the reference voltage applied thereto by a predetermined amount when the control signal has the second state, said reducing means being disabled in response to the first state of the control signal.

2. The power supply control circuitry according to claim 1, further including a second voltage source coupled by resistor means to the input voltage from the input voltage source and the second input of the comparing means for generating a voltage varying with time and the magnitude of the input voltage for substantially equalizing the relative time durations of successive first states of the control signal, the magnitude of the voltage generated by the second voltage source being initially set to a predetermined minimum magnitude in response to each pulse from the pulse signal source, and said comparing means responsive to the voltage generated by the second voltage source for generating the second state of the control signal when the magnitude of the voltage generated by the second voltage source is substantially equal to the magnitude of the reference voltage.

3. The power supply control circuitry according to claim 1, further including diode means for coupling pulses from the pulse signal source to the second input of the comparing means.

4. The power supply according to claim 1, wherein the reference signal source includes zener diode means coupled by resistor means to the input voltage for providing the reference voltage.

5. Control circuitry for a pulse-width-modulated power supply including switching means responsive to a first state of a control signal for coupling an input voltage from an input voltage source to output means and to a second state of the control signal for decoupling the input voltage from the output means for generating an output voltage, said control circuitry comprising:
said switching means including a first transistor having base, emitter and collector terminals, the emitter terminal of the first transistor coupled to the input voltage, and the base terminal of the first transistor coupled to the control signal;
a pulse signal source for generating a train of pulses at a predetermined repetition frequency;
a reference signal source for generating a reference voltage;
means, having a first input coupled by input resistor means to the reference voltage and coupled by the output means to the output voltage, for comparing the output voltage to the reference voltage and generating at its output the first state of the control signal in response to each pulse from the pulse signal source and the second state of the control signal when the magnitude of the output voltage is substantially equal to the reference voltage;
current limit means including current limit resistor means coupled between the output voltage and the collector terminal of the first transistor for sensing when a predetermined current is being conducted by the first transistor, a second transistor having base, emitter and collector terminals, first resistor means coupled between the collector terminal of the second transistor and signal ground, and diode means and second resistor means series coupled between the second input of the comparing means and the collector terminal of the second transistor, the current limit resistor means further being coupled between the base and emitter terminals of the second transistor, the second transistor conducting a current when a predetermined current is flowing in the current limit resistor means for generating a voltage across the first resistor means, and the comparing means further being responsive to the voltage across the first resistor means for generating the second state of the control signal when the magnitude of the voltage across the first resistor means is substantially equal to the magnitude of the reference voltage; and
means coupled to the first input of the comparing means for reducing the magnitude of the reference voltage applied thereto by a predetermined amount when the control signal has the second state, said reducing means being disabled in response to the first state of the control signal.

6. The power supply control circuitry according to claim 5 further including second diode means coupled by the second resistor means to the second input of the comparing means.

7. The power supply control circuitry according to claim 5, further including base drive transistor means having an emitter terminal coupled to the switching means, a base terminal coupled by resistor means to the output of the comparing means and a collector terminal coupled by resistor means to signal ground, and wherein the reducing means includes diode means and resistor means coupled in series between the first input of the comparing means and the collector terminal of the base drive transistor means.

8. The power supply control circuitry according to claim 5, further including resistor means for coupling the power supply output voltage to the second input of the comparing means.

9. The power supply control circuitry according to claim 5, further including means coupled between the power supply output voltage and signal ground for conducting a predetermined current.

10. The power supply control circuitry according to claim 9, wherein the conducting means is comprised of a light emitting diode and resistor coupled in series.

11. Control circuitry for a pulse-width-modulated power supply including switching means responsive to a first state of a control signal for coupling an input voltage from an first voltage source to output means and to a second state of the control signal for decoupling the input voltage from the output means for generating an output voltage, said control circuitry comprising:

a pulse signal source for generating a train of pulses at a predetermined repetition frequency;

a reference signal source for generating a reference voltage;

means for, having a first input coupled by input resistor means to the reference voltage and a second input coupled by the output means to the output voltage, comparing the output voltage to the reference voltage and generating at its output the first state of the control signal in response to each pulse from the pulse signal source and the second state of the control signal when the magnitude of the output voltage is substantially equal to the reference voltage;

a second voltage source including capacitor means coupled by diode means to the second input of the comparing means and coupled by resistor means to the input voltage for generating a voltage varying with time and the magnitude of the input voltage for substantially equalizing the relative time durations of successive first states of the control signal, the magnitude of the voltage generated by the second voltage source being initially set to a predetermined minimum magnitude in response to each pulse from the pulse signal source, and said comparing means responsive to the voltage generated by the second voltage source for generating the second state of the control signal when the magnitude of the voltage generated by the second voltage source is substantially equal to the magnitude of the reference voltage; and means coupled to the first input of the comparing means for reducing the magnitude of the reference voltage applied thereto by a predetermined amount when the control signal have the second state, said reducing means being disabled in response to the first state of the control signal.

12. Control circuitry for a pulse-width-modulated power supply including switching means responsive to a first state of a control signal for coupling an input voltage from an input voltage source to output means and to a second state of the control signal for decoupling the input voltage from the output means for generating an output voltage, said control circuitry comprising:

said switching means including first and second transistors each having base, emitter and collector terminals, the emitter terminal of the first transistor coupled to the input voltage, the base terminal of the first transistor coupled to the emitter terminal of the second transistor, and the base terminal of the second transistor coupled to the control signal;

a pulse signal source for generating a train of pulses at a predetermined repetition frequency;

a reference signal source for generating a reference voltage;

means for filtering the output voltage;

means, having a first input coupled by input resistor means to the reference voltage and a second input coupled by the filtering means to the filtered output voltage, for comparing the filtered output voltage to the reference voltage and generating at its output the first state of the control signal in response to each pulse from the pulse signal source and the second state of the control signal when the magnitude of the filtered output voltage is substantially equal to the reference voltage;

feedback means coupled between the output of the comparing means and the filtering means for substantially equalizing the duty cycle of the control signal;

current limit means including current limit resistor means coupled between the collector terminals of the first and second transistors for sensing when a predetermined current is being conducted by the first transistor, a third transistor having base, emitter and collector terminals, first resistor means coupled between the collector terminal of the third transistor and signal ground, and diode means and second resistor means series coupled between the second input of the comparing means and the collector terminal of the third transistor, the current limit resistor means further being coupled between the base and emitter terminals of the third transistor conducting a current when a predetermined current is flowing in the current limit resistor means for generating a voltage across the first resistor means, and the comparing means further being responsive to the voltage across the first resistor means for generating the second state of the control signal when the magnitude of the voltage across the first resistor means is substantially equal to the magnitude of the reference voltage; and means coupled to the first input of the comparing means for reducing the magnitude of the reference voltage applied thereto by a predetermined amount when the control signal has the second state, said reducing means being disabled in response to the first state of the control signal.

13. Control circuitry for a pulse-width-modulated power supply including switching means responsive to a first state of a control signal for coupling an input voltage from an input voltage source to output means and to a second state of the control signal for decoupling the input voltage from the output means for generating an output voltage, said control circuitry comprising:

a pulse signal source for generating a train of pulses at a predetermined repetition frequency;

a reference signal source for generating a reference voltage;

means for filtering the output voltage;

means, having a first input coupled by input resistor means to the reference voltage and a second input coupled by the filtering means to the filtered output voltage, for comparing the filtered output voltage to the reference voltage and generating at its output the first state of the control signal in response to each pulse from the pulse signal source and the second state of the control signal when the magnitude of the filtered output voltage is substantially equal to the reference voltage;

feedback means coupled between the output of the comparing means and filtering means for substantially equalizing the duty cycle of the control signal; and means coupled to the the first input of the comparing means for reducing the magnitude of the reference voltage applied thereto by a predetermined amount when the control signal has the second state, said reducing means being disabled in response to the first state of the control signal.

14. Control circuitry for a pulse-width-modulated power supply including switching means responsive to a first state of a control signal for coupling an input voltage from an input voltage source to output means and to a second state of the control signal for decoupling the input voltage from the output means for generating an output voltage, said control circuitry comprising:

said switching means including a first transistor having base, emitter and collector terminals, the emitter terminal of the first transistor coupled to the input voltage, and the base terminal of the first transistor coupled to the control signal;

a pulse signal source for generating a train of pulses at a predetermined repetition frequency;

a reference signal source for generating a reference voltage;

means for filtering the output voltage;

means, having a first input coupled by input resistor means to the reference voltage and a second input coupled by the filtering means to the filtered output voltage, for comparing the filtered output voltage to the reference voltage and generating at its output the first state of the control signal in response to each pulse from the pulse signal source and the second state of the control signal when the magnitude of the filtered output voltage is substantially equal to the reference voltage;

feedback means coupled between the output of the comparing means and the filtering means for substantially equalizing the duty cycle of the control signal;

current limit means including current limit resistor means coupled between the output voltage and the collector terminal of the first transistor for sensing when a predetermined current is being conducted by the first transistor, a second transistor having base, emitter and collector terminals, first resistor means coupled between the collector terminal of the second transistor and signal ground, and diode means and second resistor means series coupled between the second input of the comparing means and the collector terminal of the second transistor, the current limit resistor means further being coupled between the base and emitter terminals of the second transistor, the second transistor conducting a current when a predetermined current is flowing in the current limit resistor means for generating a voltage across the first resistor means, and the comparing means further being responsive to the voltage across the first resistor means for generating the second state of the control signal when the magnitude of the voltage across the first resistor means is substantially equal to the magnitude of the reference voltage; and means coupled to the first input of the comparing means for reducing the magnitude of the reference voltage applied thereto by a predetermined amount when the control signal has the second state, said reducing means being disabled in response to the first state of the control signal.

15. Control circuitry for a pulse-width-modulated power supply including switching means responsive to a first state of a control signal for coupling an input voltage from an input voltage source to output means and to a second state of the control signal for decoupling the input voltage from the output means for generating an output voltage, said control circuitry comprising:

a pulse signal source for generating a train of pulses at a predetermined repetition frequency;

a reference signal source for generating a reference voltage;

means for filtering the output voltage;

means, having a first input coupled by input resistor means to the reference voltage and a second input coupled by the filtering means to the filtered output voltage, for comparing the filtered output voltage to the reference voltage and generating at its output the first state of the control signal in response to each pulse from the pulse signal source and the second state of the control signal when the magnitude of the filtered output voltage is substantially equal to the reference voltage;

feedback means coupled between the output of the comparing means and the filtering means for substantially equalizing the duty cycle of the control signal;

current limit means including current limit resistor means coupled between the switching means and output means for sensing when a predetermined current is being conducted thereby, and further having an output coupled by diode means and resistor means to the second input of the comparing means for indicating when a predetermined current is flowing in the current limit resistor means, and the comparing means further being responsive to the output of the current limit means for generating the second state of the control signal; and means coupled to the first input of the comparing means for reducing the magnitude of the reference voltage applied thereto by a predetermined amount when the control signal has the second state, said reducing means being disabled in response to the first state of the control signal.

* * * * *